United States Patent

Mori (10) Patent No.: US 11,296,548 B2
(45) Date of Patent: Apr. 5, 2022

(54) WIRELESS POWER FEEDER

(71) Applicant: SHINKO ELECTRIC INDUSTRIES CO., LTD., Nagano (JP)

(72) Inventor: Kenichi Mori, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 0 days.

(21) Appl. No.: 17/237,382

(22) Filed: Apr. 22, 2021

(65) Prior Publication Data

US 2021/0367450 A1 Nov. 25, 2021

(30) Foreign Application Priority Data

May 19, 2020 (JP) .............................. JP2020-087694

(51) Int. Cl.
*H02M 3/06* (2006.01)
*H02J 50/05* (2016.01)
*H02J 50/00* (2016.01)

(52) U.S. Cl.
CPC ............ *H02J 50/05* (2016.02); *H02J 50/005* (2020.01)

(58) Field of Classification Search
CPC ........ H02J 50/05; H02J 50/005; H04B 5/0012
See application file for complete search history.

(56) References Cited

U.S. PATENT DOCUMENTS

| 9,824,817 | B2 | 11/2017 | Kusunoki et al. | |
| 2014/0292103 | A1* | 10/2014 | Waffenschmidt | H02J 50/05 307/109 |
| 2014/0327321 | A1* | 11/2014 | Kusunoki | H04B 5/0037 307/104 |
| 2015/0236514 | A1* | 8/2015 | Nomura | H02J 50/05 307/104 |
| 2015/0366610 | A1* | 12/2015 | Tsuruta | A61B 18/1492 606/46 |

FOREIGN PATENT DOCUMENTS

WO 2013/108893 7/2013

* cited by examiner

*Primary Examiner* — Daniel Cavallari
*Assistant Examiner* — Rasem Mourad
(74) *Attorney, Agent, or Firm* — IPUSA, PLLC

(57) ABSTRACT

A wireless power feeder includes a rotatable body and a non-rotatable body including a first surface and a second surface, respectively, that face each other at a predetermined distance, and a power receiving board and a power feeding board on the first surface and the second surface, respectively. The power receiving board includes a pair of first electrodes each including alternating first interconnect patterns and first slits in respective first regions bent at the first slits to form first corrugated parts where a distance from the first surface alternately increases and decreases. The power feeding board includes a pair of second electrodes each including alternating second interconnect patterns and second slits in respective second regions bent at the second slits to form second corrugated parts where a distance from the second surface alternately increases and decreases. The first and second corrugated parts face each other.

8 Claims, 6 Drawing Sheets

WIRELESS POWER FEEDER

CROSS-REFERENCE TO RELATED APPLICATION

This application is based upon and claims priority to Japanese patent application No. 2020-087694, filed on May 19, 2020, the entire contents of which are incorporated herein by reference.

FIELD

A certain aspect of the embodiment discussed herein is related to wireless power feeders.

BACKGROUND

Various types of wireless power feeders that wirelessly feed electric power are proposed, examples of which include a wireless power feeder that uses electric field coupling. The wireless power feeder using electric field coupling may be used to feed power to a non-rotatable body, while a method of wirelessly feeding power to a rotatable body is also proposed. For example, a structure where electrodes are provided on a rotatable body and on the stationary side such that the electrodes on the rotatable body and the electrodes on the stationary side face each other is proposed. (See, for example, International Publication Pamphlet No. WO 2013/108893.)

SUMMARY

According to an aspect of the present invention, a wireless power feeder includes a rotatable body and a non-rotatable body including a first surface and a second surface, respectively, that face each other at a predetermined distance, and a power receiving board and a power feeding board on the first surface and the second surface, respectively. The power receiving board includes a pair of first electrodes each including alternating first interconnect patterns and first slits in respective first regions bent at the first slits to form first corrugated parts where a distance from the first surface alternately increases and decreases. The power feeding board includes a pair of second electrodes each including alternating second interconnect patterns and second slits in respective second regions bent at the second slits to form second corrugated parts where a distance from the second surface alternately increases and decreases. The first and second corrugated parts face each other.

The object and advantages of the embodiment will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENT

In wireless power feeders, it is desired to increase the area of electrodes to secure electric power. According to the above-described structure where the rotatable body is wirelessly fed with power, however, it is difficult to increase the area of electrodes.

Thus, it is desired to provide a wireless power feeder in which the area of electrodes can be increased.

According to an aspect of the present invention, a wireless power feeder in which the area of electrodes can be increased is provided.

A preferred embodiment of the present invention will be explained with reference to accompanying drawings. In the following, the same elements are referred to using the same reference numerals, and a duplicate description thereof may be omitted.

Figure 1A:
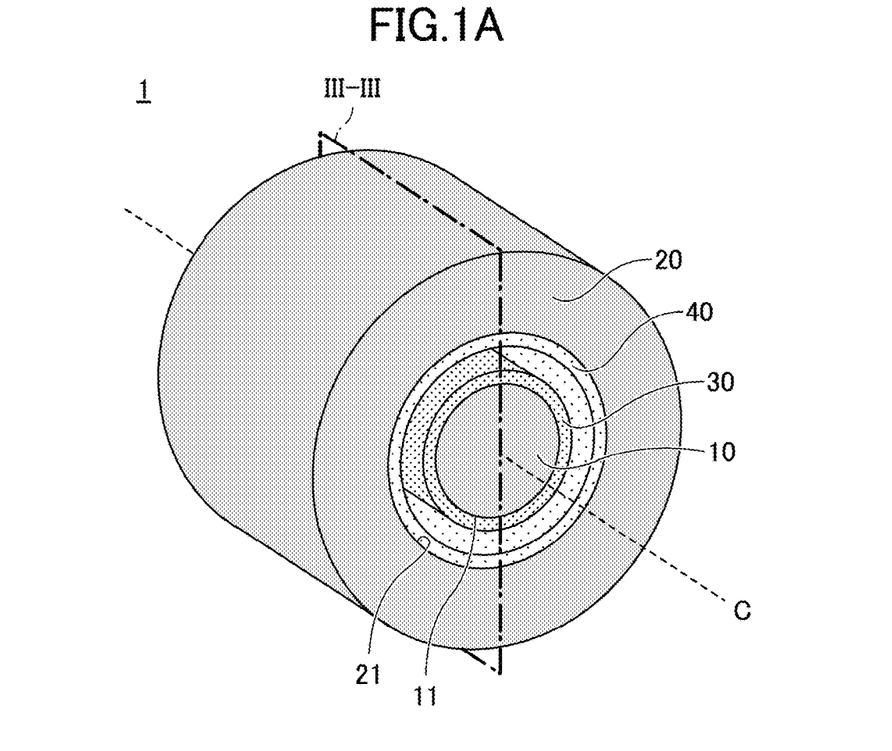
FIGS. 1A and 1B are diagrams illustrating a wireless power feeder according to an embodiment.
Figure 1B:
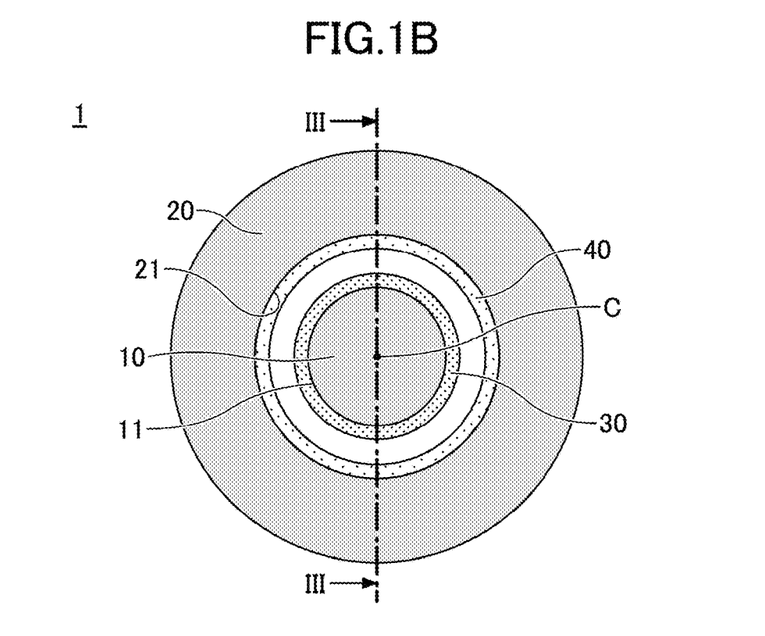

FIGS. 1A and 1B are a perspective view and a front view, respectively, a wireless power feeder according to an embodiment. Referring to FIGS. 1A and 1B, a wireless power feeder 1 includes a rotatable body 10, a non-rotatable body 20, a power receiving board 30, and a power feeding board 40.

The rotatable body 10 is, for example, a cylindrical member having an outer cylindrical surface 11 and configured to rotate about an axis C. The non-rotatable body 20 is, for example, a hollow cylindrical (pipe-shaped) member and fixed to a housing or the like that is not depicted. The non-rotatable body 20 has an inner cylindrical surface 21 that faces the outer cylindrical surface 11 of the rotatable body 10 at a predetermined distance from the outer cylindrical surface 11. That is, the rotatable body 10 is placed within the non-rotatable body 20 without contacting the non-rotatable body 20 and configured to rotate about the axis C. The rotatable body 10 and the non-rotatable body 20 may be formed of, for example, metal such as iron or aluminum (a conductor).

The power receiving board 30 is placed on the outer cylindrical surface 11 of the rotatable body 10. A semiconductor device, etc., (not depicted) that require electric power are mounted on the power receiving board 30. The power feeding board 40 is placed on the inner cylindrical surface 21 of the non-rotatable body 20. The power feeding board 40 is connected to a controller provided external to the wireless power feeder 1 by wires or the like that are not depicted. The power receiving board 30 and the power feeding board 40 include respective pairs of electrodes. The electrodes of the power receiving board 30 and the electrodes of the power feeding board 40 face each other at a predetermined distance (for example, approximately 1 mm to approximately 2 mm) from each other to be capacitively coupled. This allows electric power to be wirelessly fed from the power feeding board 40 placed on the non-rotatable body 20 to the power receiving board 30 placed on the rotatable body 10 under the control of the controller provided external to the wireless power feeder 1. The power receiving board 30 and the power feeding board 40 are described in detail below.

Figure 2A:
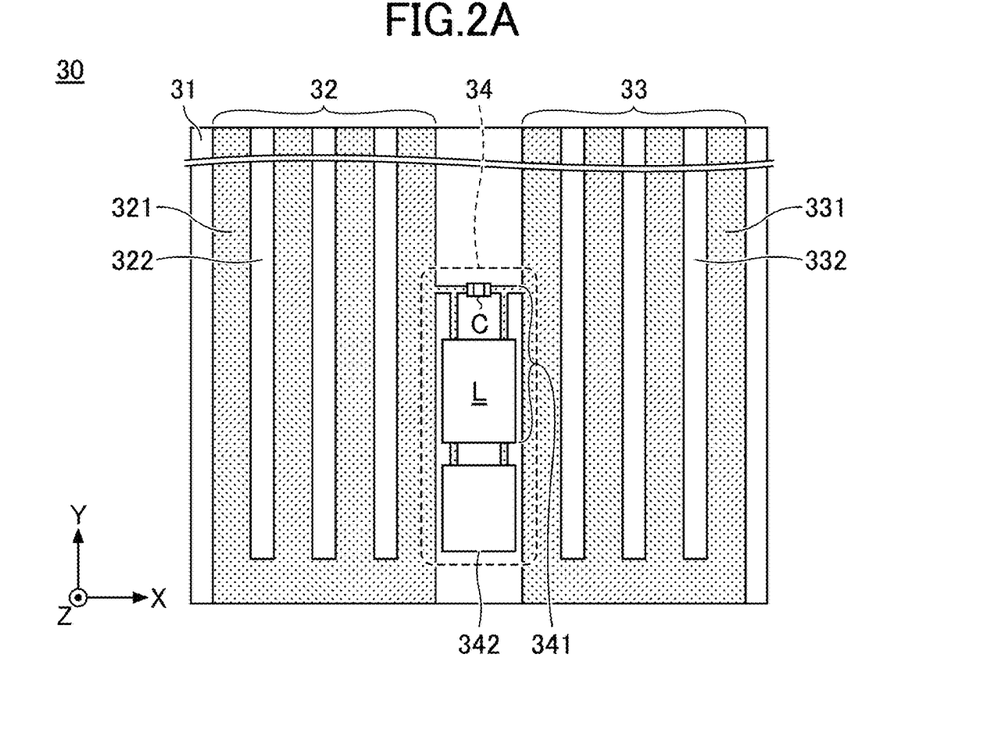
FIGS. 2A and 2B are plan views of a power receiving board and a power feeding board, respectively, according to the embodiment.
Figure 2B:
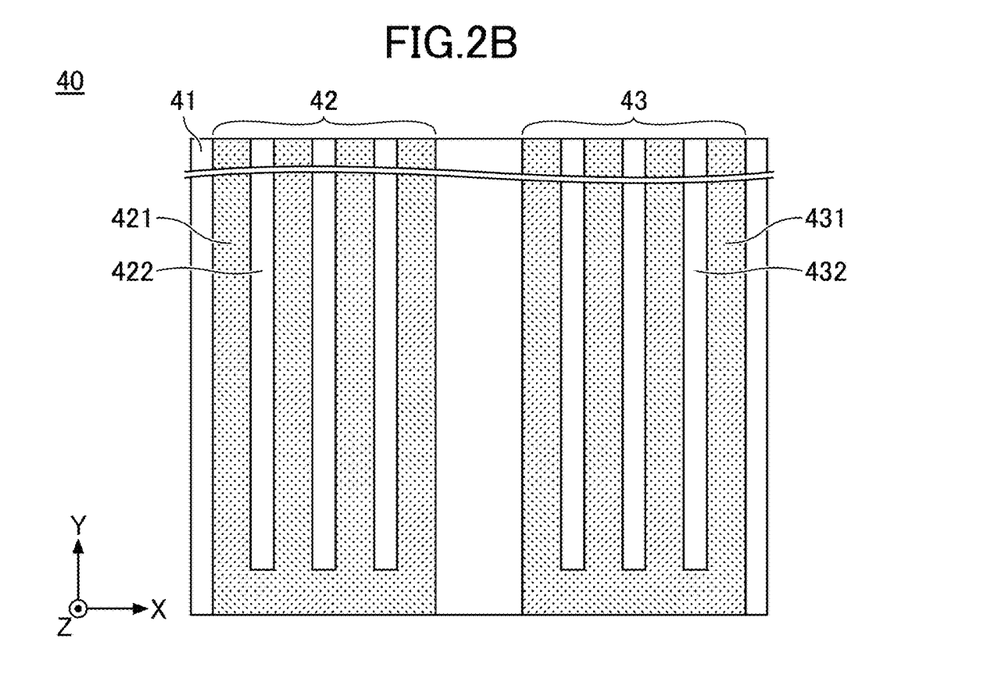

FIGS. 2A and 2B are plan views of a power receiving board and a power feeding board, respectively, according to the first embodiment. While the power receiving board 30 and the power feeding board 40 are folded into wavy shape as described below, FIGS. 2A and 2B illustrate the power receiving board 30 and the power feeding board 40 that are flat before being folded.

The power receiving board 30 illustrated in FIG. 2A includes an insulating substrate 31 and a pair of electrodes 32 and 33 each formed of a conductor pattern on the substrate 31. For example, the electrode 32 and the electrode 33 are placed on opposites sides in the X direction on the substrate 31. The substrate 31 may be formed of, for example, flexible resin such as polyimide. The electrodes 32 and 33 may be formed of, for example, metal such as copper. The surfaces of the electrodes 32 and 33 may be plated with a film of metal such as nickel, palladium or gold. The details of the electrodes 32 and 33 are as described below.

The electrode 32 includes plural interconnect patterns 321 elongated in the same direction (the Y direction in FIG. 2A) and plural elongated slits 322 positioned one between each adjacent two of the interconnect patterns 321. The interconnect patterns 321 are connected together at their respective first ends in the Y direction and are free at their respective second ends in the Y direction. That is, the second ends of the interconnect patterns 321 are separated and not connected. The insulating substrate 31 is exposed in the slits 322 where the interconnect patterns 321 are not formed. The interconnect patterns 321 may alternatively be connected together at positions other than the first ends as desired. Each slit 322 has a width (in the X direction) of, for example, approximately 1 mm. The same applies to other slits described below.

The electrode 33 includes plural interconnect patterns 331 elongated in the same direction (the Y direction in FIG. 2A) and plural elongated slits 332 positioned one between each adjacent two of the interconnect patterns 331. The interconnect patterns 331 are connected together at their respective first ends in the Y direction and are free at their respective second ends in the Y direction. That is, the second ends of the interconnect patterns 331 are separated and not connected. The insulating substrate 31 is exposed in the slits 332 where the interconnect patterns 331 are not formed. The interconnect patterns 331 may alternatively be connected together at positions other than the first ends as desired.

Figure 3:
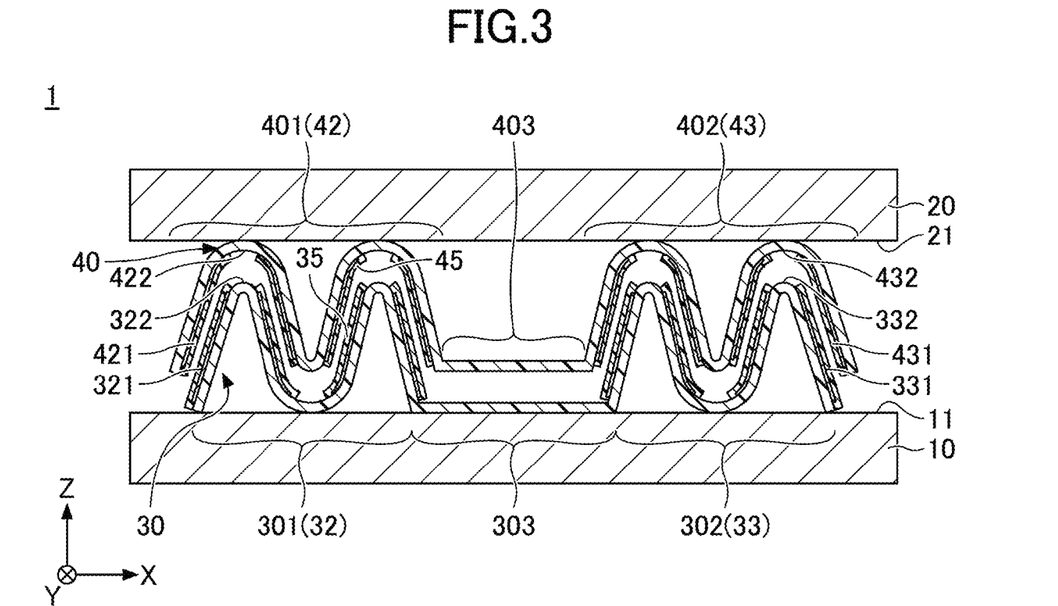
FIG. 3 is a sectional view of the power receiving board and the power feeding board according to the embodiment attached to a rotatable body and a non-rotatable body, respectively.

Although not depicted in FIG. 2A, the interconnect patterns 321 and 331 may be coated with an insulating layer 35 as illustrated in FIG. 3. The insulating layer 35 may be provided to continuously coat the interconnect patterns 321 and 331. The insulating layer 35 may be formed of, for example, flexible resin such as polyimide.

Thus, the electrode 32 is, for example, a comb-shaped electrode in which the interconnect patterns 321 and the slits 322 are alternately arranged and the interconnect patterns 321 are electrically interconnected. Furthermore, the electrode 33 is, for example, a comb-shaped electrode in which the interconnect patterns 331 and the slits 332 are alternately arranged and the interconnect patterns 331 are electrically interconnected. The electrode 32 and the electrode 33 are spaced a predetermined distance apart with the free ends of their respective comb teeth (interconnect patterns) facing in the same direction.

An area between the electrodes 32 and 33 on the substrate 31 may be used as a component mounting region 34. The component mounting region 34 is where electronic components that the power receiving board 30 uses to receive power from the power feeding board 40 are mounted. For example, a resonant circuit 341 including a resonant inductance component L and a resonant capacitor C, a circuit 342 including, for example, at least one of a rectifier circuit and a smoothing circuit, etc., are mounted in the component mounting region 34. FIG. 2A schematically illustrates the circuit of the component mounting region 34.

The power feeding board 40 illustrated in FIG. 2B includes an insulating substrate 41 and a pair of electrodes 42 and 43 each formed of a conductor pattern on the substrate 41. For example, the electrode 42 and the electrode 43 are placed on opposites sides in the X direction on the substrate 41. The substrate 41 may be formed of, for example, flexible resin such as polyimide. The electrodes 42 and 43 may be formed of, for example, metal such as copper. The surfaces of the electrodes 42 and 43 may be plated with a film of metal such as nickel, palladium or gold. The details of the electrodes 42 and 43 are as described below.

The electrode 42 includes plural interconnect patterns 421 elongated in the same direction (the Y direction in FIG. 2B) and plural elongated slits 422 positioned one between each adjacent two of the interconnect patterns 421. The interconnect patterns 421 are connected together at their respective first ends in the Y direction and are free at their respective second ends in the Y direction. The insulating substrate 41 is exposed in the slits 422 where the interconnect patterns 421 are not formed. The interconnect patterns 421 may alternatively be connected together at positions other than the first ends as desired.

The electrode 43 includes plural interconnect patterns 431 elongated in the same direction (the Y direction in FIG. 2B) and plural elongated slits 432 positioned one between each adjacent two of the interconnect patterns 431. The interconnect patterns 431 are connected together at their respective first ends in the Y direction and are free at their respective second ends in the Y direction. The insulating substrate 41 is exposed in the slits 432 where the interconnect patterns 431 are not formed. The interconnect patterns 431 may alternatively be connected together at positions other than the first ends as desired.

Although not depicted in FIG. 2B, the interconnect patterns 421 and 431 may be coated with an insulating layer 45 as illustrated in FIG. 3. The insulating layer 45 may be provided to continuously coat the interconnect patterns 421 and 431. The insulating layer 45 may be formed of, for example, flexible resin such as polyimide.

Thus, the electrode 42 is, for example, a comb-shaped electrode in which the interconnect patterns 421 and the slits 422 are alternately arranged and the interconnect patterns 421 are electrically interconnected. Furthermore, the electrode 43 is, for example, a comb-shaped electrode in which the interconnect patterns 431 and the slits 432 are alternately arranged and the interconnect patterns 431 are electrically interconnected. The electrode 42 and the electrode 43 are spaced a predetermined distance apart with the free ends of their respective comb teeth (interconnect patterns) facing in the same direction.

FIG. 3 is a sectional view of a power receiving board and a power feeding board according to this embodiment attached to a rotatable body and a non-rotatable body, respectively, illustrating a section taken along the line of FIGS. 1A and 1B. In FIG. 3, the X direction is a direction parallel to the axis C (see FIGS. 1A and 1B), the Y direction is a direction perpendicular to the axis C and along the outer cylindrical surface 11, and the Z direction is a direction normal to the outer cylindrical surface 11.

Referring to FIG. 3, the power receiving board 30 includes corrugated parts 301 and 302 folded into wavy shape and a flat part 303 positioned between the corrugated parts 301 and 302. The above-described component mounting region 34 (not depicted in FIG. 3) is provided within the flat part 303. The power feeding board 40 includes corrugated parts 401 and 402 folded into wavy shape and a flat part 403 positioned between the corrugated parts 401 and 402.

The corrugated parts 301 and 302 are regions in which the electrodes 32 and 33 are formed, where the power receiving board 30 is bent at the slits 322 and 332 so that portions where the power receiving board 30 moves away from and portions where the power receiving board 30 moves toward the outer cylindrical surface 11 of the rotatable body 10 alternately appear, that is, the distance between the power receiving board 30 and the outer cylindrical surface 11 of the rotatable body 10 alternately increases and decreases. The corrugated parts 401 and 402 are regions in which the electrodes 42 and 43 are formed, where the power feeding board 40 is bent at the slits 422 and 432 so that portions where the power feeding board 40 moves away from and portions where the power feeding board 40 moves toward the inner cylindrical surface 21 of the non-rotatable body 20 alternately appear, that is, the distance between the power feeding board 40 and the inner cylindrical surface 21 of the non-rotatable body 20 alternately increases and decreases.

The power receiving board 30 is fixed, at portions of the corrugated parts 301 and 302 where the slits 322 and 332 are formed, to the outer cylindrical surface 11 of the rotatable body 10 by an adhesive or the like such that the longitudinal direction of the interconnect patterns 321 of the electrode 32 and the interconnect patterns 331 of the electrode 33 is substantially perpendicular to the axis C. That is, the slits 322 and 332 are positioned in the regions of the power receiving board 30 closest to the rotatable body 10.

The power feeding board 40 is fixed, at portions of the corrugated parts 401 and 402 where the slits 422 and 432 are formed, to the inner cylindrical surface 21 of the non-rotatable body 20 by an adhesive or the like such that the longitudinal direction of the interconnect patterns 421 of the electrode 42 and the interconnect patterns 431 of the electrode 43 is substantially perpendicular to the axis C. That is, the slits 422 and 432 are positioned in the regions of the power feeding board 40 closest to the non-rotatable body 20.

The corrugated part 301 and the corrugated part 401 are positioned to face each other, being spaced a substantially constant distance apart. Furthermore, the corrugated part 302 and the corrugated part 402 are positioned to face each other, being spaced a substantially constant distance apart. Furthermore, the flat part 303 and the flat part 403 are positioned to face each other, being spaced a substantially constant distance apart.

The wavy or corrugated shape refers to, for example, a shape close to a sine wave. The wavy or corrugated shape, however, is not limited to a shape close to a sine wave, and may be other shapes such as a shape close to a triangle wave, as long as the shape is bent or folded to include first and second alternate portions where the distance from a predetermined surface increases in the first portions and the distance from the predetermined surface decreases in the second portions.

Figure 4:
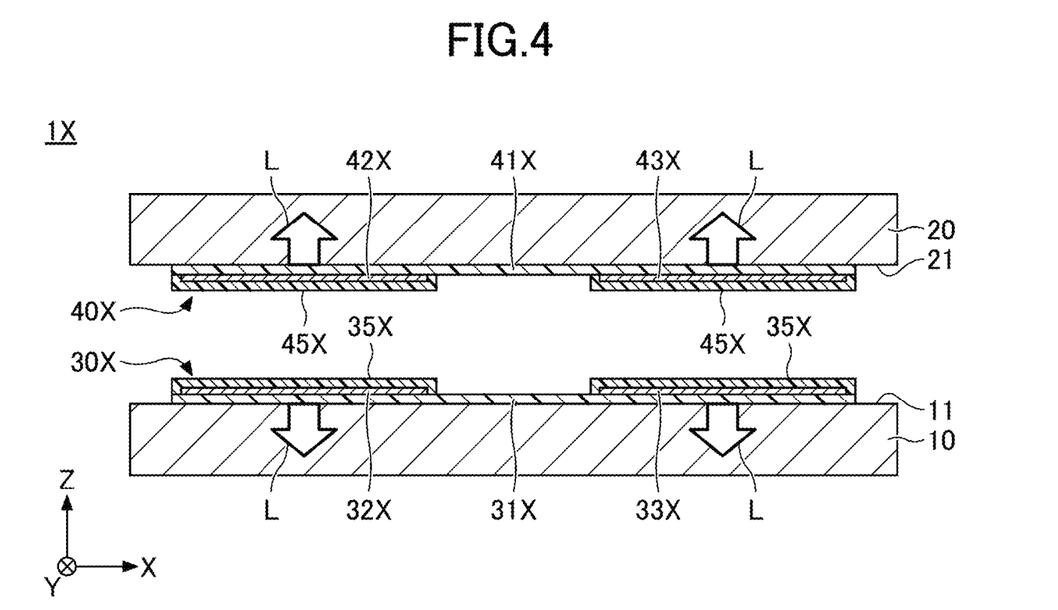
FIG. 4 is a sectional view of a power receiving board and a power feeding board according to a comparative example attached to the rotatable body and the non-rotatable body, respectively.

Here, a power receiving board and a power feeding board according to a comparative example are described. FIG. 4 is a sectional view of a power receiving board and a power feeding board according to the comparative example attached to a rotatable body and a non-rotatable body, respectively, illustrating a section corresponding to FIG. 3.

According to a wireless power feeder 1X according to the comparative example illustrated in FIG. 4, a power receiving board 30X includes a pair of electrodes 32X and 33X on a substrate 31X. The electrodes 32X and 33X are coated with an insulating layer 35X. The insulating layer 35X may be provided to continuously coat the electrodes 32X and 33X. The substrate 31X has the same planar shape as the substrate 31 of FIG. 2A, while each of the electrodes 32X and 33X has a rectangular planar shape in which no slits are formed. Furthermore, a power feeding board 40X includes a pair of electrodes 42X and 43X on a substrate 41X. The electrodes 42X and 43X are coated with an insulating layer 45X. The insulating layer 45X may be provided to continuously coat the electrodes 42X and 43X. The substrate 41X has the same planar shape as the substrate 41 of FIG. 2B, while each of the electrodes 42X and 43X has a rectangular planar shape in which no slits are formed.

The power receiving board 30X includes no corrugated part and is placed along the outer cylindrical surface 11 of the rotatable body 10. The power feeding board 40X includes no corrugated part and is placed along the inner cylindrical surface 21 of the non-rotatable body 20. The electrode 32X of the power receiving board 30X and the electrode 42X of the power feeding board 40X face each other, being spaced a predetermined distance apart, to be capacitively coupled. The electrode 33X of the power receiving board 30X and the electrode 43X of the power feeding board 40X face each other, being spaced a predetermined distance apart, to be capacitively coupled. This allows electric power to be wirelessly fed from the power feeding board 40X placed on the non-rotatable body 20 to the power receiving board 30X placed on the rotatable body 10.

According to the structure of FIG. 4, however, it is difficult to increase the area of electrodes and it is thus difficult to secure electric power, while increasing the area of electrodes increases the size of the entirety of a wireless power feeder (in the X direction of FIG. 4 in particular). Furthermore; each electrode is bent along the outer cylindrical surface 11 or the inner cylindrical surface 21, which is a curved surface, the electrode may be damaged. In addition, because the electrodes are close to the rotatable body 10 or the non-rotatable body 20, which is a metallic body, electric current flows out from the electrodes (as indicated by arrows L in FIG. 4), thus decreasing power transmission efficiency. Thus, the structure of FIG. 4 has various problems.

In contrast, the wireless power feeder 1 includes electrodes with corrugated parts as illustrated in FIG. 3, thus making it easy to increase the area of electrodes in a wireless power feeder having the same size as FIG. 3. That is, it is possible to secure large electric power and achieve a small wireless power feeder. Furthermore, the wireless power feeder 1 requires no electronic components to be newly added to existing wireless power feeding systems using electric field coupling. Therefore, it is possible to easily reduce size while keeping a simple circuit configuration.

Furthermore, according to the wireless power feeder 1, slits are provided one between each pair of adjacent interconnect patterns of electrodes, and the power receiving board 30 and the power feeding board 40 are bent at their respective slits serving as bending points. Therefore, the electrodes can be less likely to be damaged at their interconnect portions. Furthermore, the slits, at which no interconnect patterns are formed to expose an insulating substrate, are positioned in the regions closest to the rotatable body 10 or the non-rotatable body 20, which is a conductor such as metal. Therefore, it is possible to prevent electric current from flowing from interconnect patterns to a metal body to decrease power transmission efficiency.

Moreover, the wireless power feeder 1 is rotatable with the electrodes of the power receiving board 30 and the electrodes of the power feeding board 40 keeping a certain distance from each other while being folded into wavy shape. Therefore, the wireless power feeder 1 is suitably usable in rotary applications. For example, the wireless power feeder 1 may be applied to the crank of a motor-assisted bicycle, the actuator of a robot hand, etc.

[First Variation]

As a first variation of this embodiment, an example of providing guide members that keep a power receiving board and a power feeding board in a predetermined shape is illustrated. In the following, a description of the same components as those of the above-described embodiment may be omitted.

Figure 5:
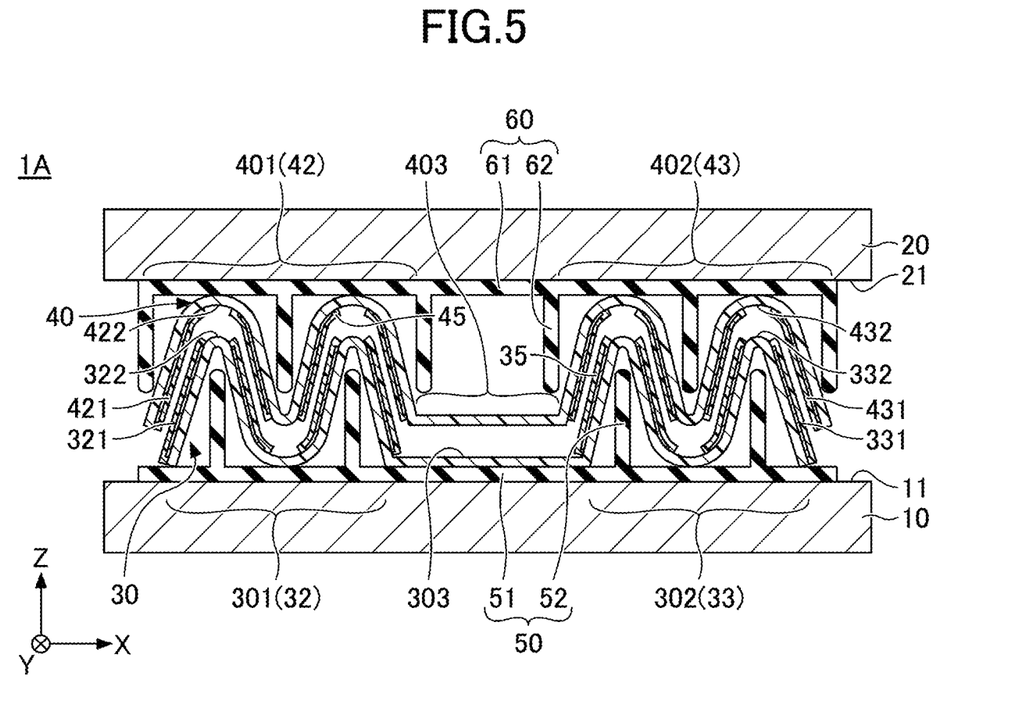
FIG. 5 is a sectional view of a power receiving board and a power feeding board according to a first variation of the embodiment attached to the rotatable body and the non-rotatable body, respectively.

FIG. 5 is a sectional view of a power receiving board and a power feeding board according to the first variation attached to a rotatable body and a non-rotatable body, respectively, illustrating a section corresponding to FIG. 3. A wireless power feeder 1A is different from the wireless power feeder 1 (see FIG. 3, etc.) in additionally including a guide ring 50 placed on the outer cylindrical surface 11 of the rotatable body 10 and a guide ring 60 placed on the inner cylindrical surface 21 of the non-rotatable body 20.

The guide ring 50 is a guide member that serves as an aid to folding and placing the power receiving board 30 and keeps the corrugated parts 301 and 302 of the power receiving board 30 in a predetermined shape. The guide ring 60 is a guide member that serves as an aid to folding and placing the power feeding board 40 and keeps the corrugated parts 401 and 402 of the power feeding board 40 in a predetermined shape.

The guide rings 50 and 60 are preferably formed of low dielectric material. Forming the guide rings 50 and 60 of low dielectric material reduces charge transfer to surrounding metal to produce the effect that an increase in power loss is suppressed. Here, the low dielectric material refers to a material having a dielectric constant of approximately 2 to approximately 5, and its specific examples include acryl, polypropylene, polystyrene, Teflon (registered trademark), MC Nylon (registered trademark), and PEEK (polyether ether ketone).

The guide ring 50 includes a hollow cylindrical attachment part 51 and plural guide walls 52 that are arranged at predetermined intervals to protrude in a radial direction (the Z direction) from the outer cylindrical surface of the attachment part 51. Each guide wall 52 may be annularly provided along the Y direction, or may be discontinuously provided along the Y direction, being divided into plural portions spaced at predetermined intervals. According to the example of FIG. 5, the guide walls 52 are not provided in a region of the power receiving board 30 where the flat part 303 is positioned, and the guide walls 52 are provided two on each side of the region where the flat part 303 is positioned in the X direction.

The guide ring 60 includes a hollow cylindrical attachment part 61 and plural guide walls 62 that are arranged at predetermined intervals to protrude in a radial direction (the Z direction) from the inner cylindrical surface of the attachment part 61. Each guide wall 62 may be annularly provided along the Y direction, or may be discontinuously provided along the Y direction, being divided into plural portions spaced at predetermined intervals. According to the example of FIG. 5, the guide walls 62 are provided one at each end of a region of the power feeding board 40 where the flat part 403 is positioned and are further provided two on each side of the region where the flat part 403 is positioned in the X direction.

The guide walls 52 of the guide ring 50 and the guide walls 62 of the guide ring 60 alternate with each other (on each side of the region where the flat part 303 is positioned and the region where the flat part 403 is positioned) in the X direction. Where two of the guide walls 62 are positioned one on each side of one of the guide walls 52, the power receiving board 30 and the power feeding board 40 are curved to be closest to the attachment part 61 around the one of the guide walls 52. Furthermore, where two of the guide walls 52 are positioned one on each side of one of the guide walls 62, the power receiving board 30 and the power feeding board 40 are curved to be closest to the attachment part 51 around the one of the guide walls 62.

Thus, by providing the guide rings 50 and 60, the corrugated parts 301 and 302 of the power receiving board 30 and the corrugated parts 401 and 402 of the power feeding board 40 can be easily folded into a desired shape. The relationship between the number of waves (alternating ridges and grooves) and the number of guide walls is not limited to the example of FIG. 5. For example, only the guide walls at both ends in the X direction may be left by omitting the guide walls in between.

Furthermore, the power receiving board 30 is folded and fixed to the guide ring 50 with an adhesive or the like in advance, and the power feeding board 40 is folded and fixed to the guide ring 60 with an adhesive or the like in advance. An adhesive or the like is then applied to surfaces of the attachment parts 51 and 61 opposite from the surfaces on which the guide walls 52 and 62 protrude, and the attachment parts 51 and 61 are inserted between the rotatable body 10 and the ono-rotatable body 20. For example, the rotatable body 10 is inserted into the guide ring 50 and the guide ring 60 is inserted into the non-rotatable body 20. In this manner, the wireless power feeder 1A can be easily manufactured. Unlike the wireless power feeder 1A, in the case of not using the guide rings 50 and 60, the non-rotatable body 20 may be structurally divisible to facilitate attachment of the power feeding board 40.

[Second Variation]

As a second variation of this embodiment, an example of providing cuts in the interconnect patterns of an electrode is illustrated. In the following, a description of the same components as those of the above-described embodiment may be omitted.

Figure 6A:
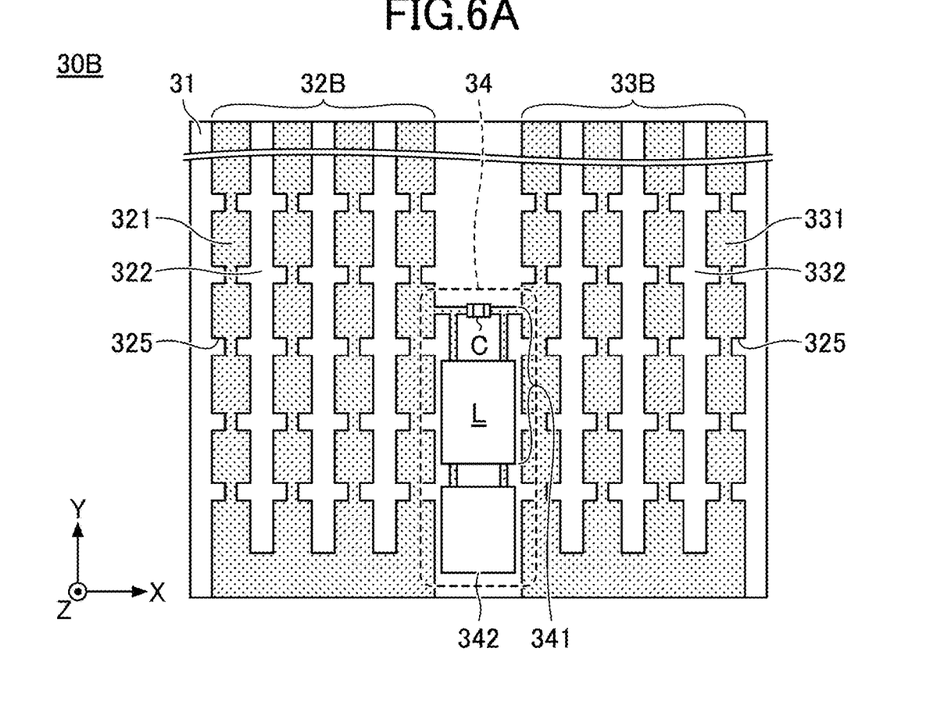
FIGS. 6A and 6B are plan views of a power receiving board and a power feeding board, respectively, according to a second variation of the embodiment.
Figure 6B:
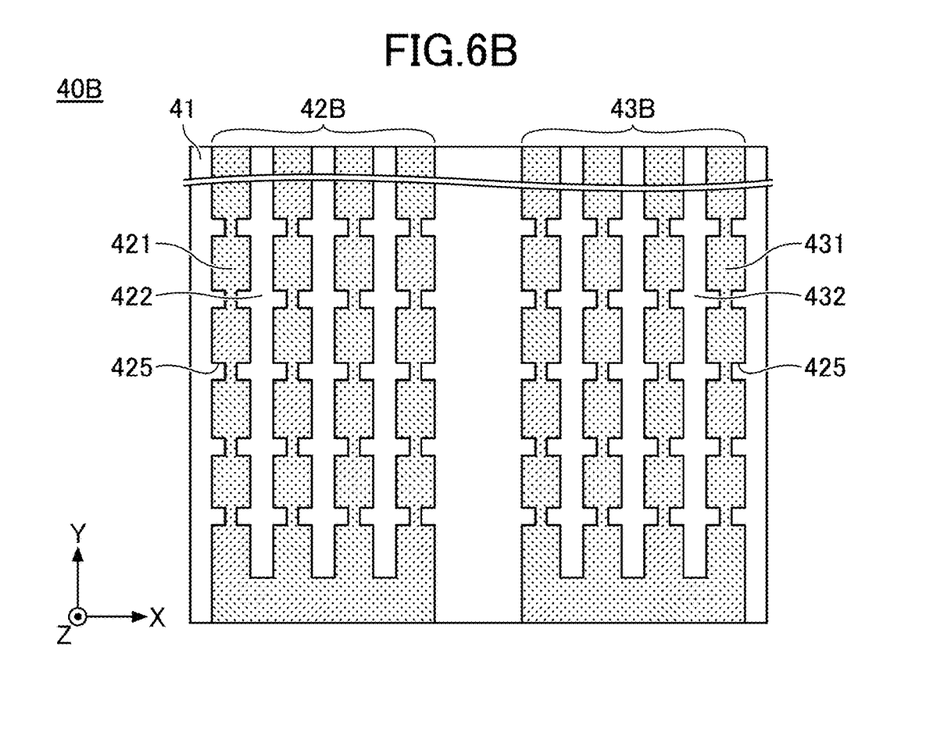

FIGS. 6A and 6B are plan views of a power receiving board and a power feeding board, respectively, according to the second variation.

A power receiving board 30B illustrated in FIG. 6A is different from the power receiving board 30 in that cuts 325 are formed in the interconnect patterns 321 of an electrode 32B and the interconnect patterns 331 of an electrode 33B in the X direction from both sides at predetermined intervals. That is, the interconnect patterns 321 and 331 vary in width to have narrower portions and wider portions, and the narrower portions are spaced apart along the longitudinal direction of the interconnect patterns 321 and 331.

A power feeding board 40B illustrated in FIG. 6B is different from the power feeding board 40 in that cuts 425 are formed in the interconnect patterns 421 of an electrode 42B and the interconnect patterns 431 of an electrode 43B in the X direction from both sides at predetermined intervals. That is, the interconnect patterns 421 and 431 vary in width to have narrower portions and wider portions, and the narrower portions are spaced apart along the longitudinal direction of the interconnect patterns 421 and 431.

Thus, by providing cuts in the interconnect patterns of electrodes to reduce the width of an interconnect pattern in part, the possibility of damage to the interconnect portions of the electrodes can be further reduced compared with the above-described embodiment.

Figure 7A:
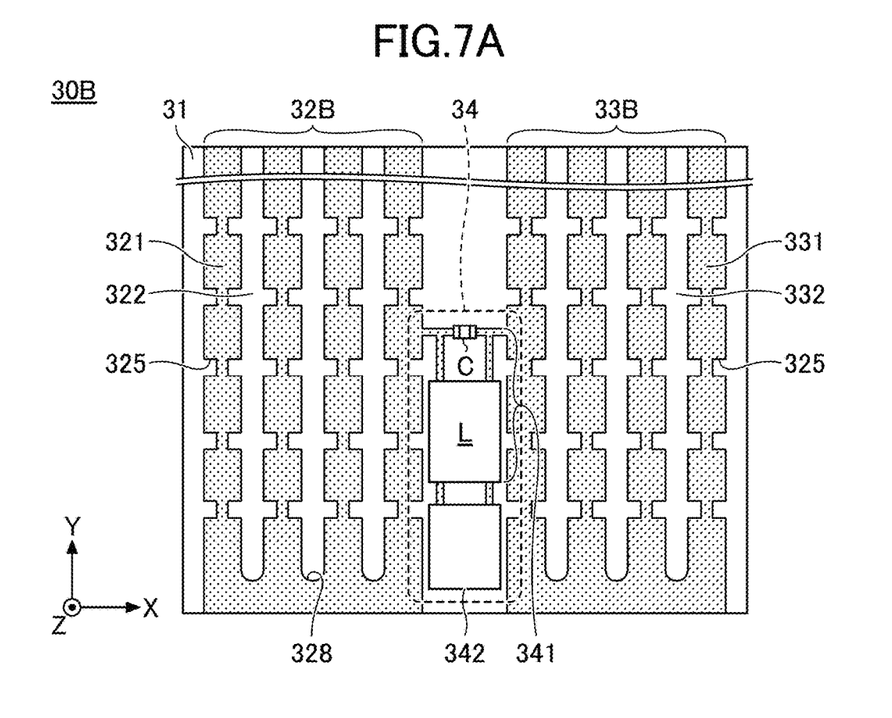
FIGS. 7A and 7B are diagrams illustrating connections of adjacent interconnect patterns from which slits extend.
Figure 7B:
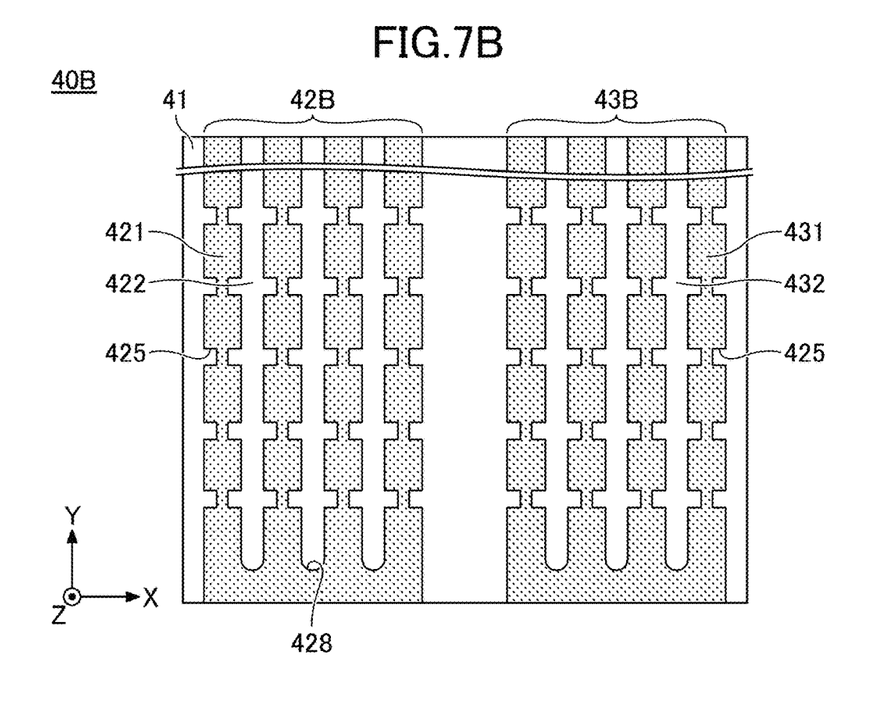

As illustrated in FIGS. 7A and 7B, connections 328 and 428 of adjacent interconnect patterns from which the slits extend, namely, the bottom or closed ends of the slits, are preferably rounded (curved without corners). This shape can prevent stress concentration and further reduce the possibility of damage to the interconnect portions of the electrodes. Rounding the connections of adjacent interconnect patterns from which the slits extend is likewise preferable in the above-described embodiment and first variation.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

For example, while the non-rotatable body is placed outside the rotatable body in the above-described embodiment and variations by way of example, a wireless power feeder according to an embodiment of the present invention may also be applied to a structure where the rotatable body is placed outside the non-rotatable body.

Furthermore, the rotatable body is not limited to a cylindrical shape and may have a polygonal prism shape (for example, a hexagonal or octagonal prism shape).

What is claimed is:

1. A wireless power feeder comprising:
a rotatable body including a first surface;
a non-rotatable body including a second surface facing the first surface at a predetermined distance from the first surface;
a power receiving board on the first surface of the rotatable body, the power receiving board including a pair of first electrodes each including
a plurality of first interconnect patterns that are electrically interconnected, and
a plurality of first slits that alternate with the plurality of first interconnect patterns; and
a power feeding board on the second surface of the non-rotatable body, the power feeding board including a pair of second electrodes each including
a plurality of second interconnect patterns that are electrically interconnected, and
a plurality of second slits that alternate with the plurality of second interconnect patterns,
wherein the first electrodes are formed one in each of first regions of the power receiving board, the first regions being bent at the plurality of first slits to form first corrugated parts where a distance from the first surface alternately increases and decreases,
the second electrodes are formed one in each of second regions of the power feeding board, the second regions being bent at the plurality of second slits to form second corrugated parts where a distance from the second surface alternately increases and decreases, and
the first corrugated parts and the second corrugated parts face each other.

2. The wireless power feeder as claimed in claim 1, wherein the rotatable body is a conductor,
the power receiving board further includes a first insulating substrate on which the first electrodes are formed, the first insulating substrate being exposed at the plurality of first slits, and
the power receiving board is closest to the rotatable body in a region where the plurality of first slits are positioned, and
wherein the non-rotatable body is a conductor,
the power feeding board further includes a second insulating substrate on which the second electrodes are formed, the second insulating substrate being exposed at the plurality of second slits, and
the power feeding board is closest to the non-rotatable body in a region where the plurality of second slits are positioned.

3. The wireless power feeder as claimed in claim 1, wherein
the power receiving board includes a first flat part between the first corrugated parts, and
the power feeding board includes a second flat part between the second corrugated parts.

4. The wireless power feeder as claimed in claim 3, wherein the power receiving board further includes an electronic component to receive power from the power feeding board, the electronic component being mounted in a region within the first flat part.

5. The wireless power feeder as claimed in claim 1, further comprising:
a first guide member on the first surface, configured to keep the first corrugated parts in a first predetermined shape; and
a second guide member on the second surface, configured to keep the second corrugated parts in a second predetermined shape.

6. The wireless power feeder as claimed in claim 5, wherein the first guide member and the second guide member are formed of a low dielectric material.

7. The wireless power feeder as claimed in claim 1, wherein
each of the first and second interconnect patterns is narrower in first portions and wider in second portions, and
the first portions are spaced apart along a longitudinal direction of the first and second interconnect patterns.

8. The wireless power feeder as claimed in claim 1, wherein
two adjacent first interconnect patterns among the plurality of first interconnect patterns are connected by a first connection, and a first slit between the two adjacent first interconnect patterns among the plurality of first slits extends from a rounded side of the first connection, and
two adjacent second interconnect patterns among the plurality of second interconnect patterns are connected by a second connection, and a second slit between the two adjacent second interconnect patterns among the plurality of second slits extends from a rounded side of the second connection.

\* \* \* \* \*